US008892564B2

(12) United States Patent
Butler et al.

(10) Patent No.: US 8,892,564 B2
(45) Date of Patent: Nov. 18, 2014

(54) INDEXING FOR DATA HAVING INDEXABLE AND NON-INDEXABLE PARENT NODES

(75) Inventors: Mark Henry Butler, Bristol (GB);
 David Murray Banks, Bristol (GB);
 Scott Alan Stanley, Hayward, CA (US);
 Ruel Calalo, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 11/261,752

(22) Filed: Oct. 28, 2005

(65) Prior Publication Data

US 2006/0095446 A1    May 4, 2006

(30) Foreign Application Priority Data

Oct. 29, 2004   (GB) .................................. 0424137.8

(51) Int. Cl.
 *G06F 17/30*   (2006.01)
 *G06F 15/16*   (2006.01)

(52) U.S. Cl.
 CPC .............................. *G06F 17/30911* (2013.01)
 USPC ...................................................... 707/741

(58) Field of Classification Search
 CPC ................... G06F 17/30321; G06F 17/30327;
        G06F 17/30619; G06F 17/30625
 USPC .......................................... 707/101, 696, 741
 See application file for complete search history.

(56) References Cited

U.S. PATENT DOCUMENTS

| 5,907,844 | A * | 5/1999 | Guay et al. ..................... 707/100 |
| 6,385,610 | B1 * | 5/2002 | Deffler et al. ..................... 707/6 |
| 6,427,123 | B1 * | 7/2002 | Sedlar ................................ 702/2 |
| 6,633,886 | B1 | 10/2003 | Chong ........................... 707/102 |
| 6,910,029 | B1 * | 6/2005 | Sundaresan ....................... 707/2 |
| 2002/0082932 | A1 * | 6/2002 | Chinnappan et al. ........... 705/26 |
| 2002/0138471 | A1 * | 9/2002 | Dutta et al. ....................... 707/3 |
| 2003/0233618 | A1 * | 12/2003 | Wan ............................. 715/513 |
| 2004/0210552 | A1 * | 10/2004 | Friedman et al. ................. 707/1 |

FOREIGN PATENT DOCUMENTS

WO    01/40996 A1    6/2001

OTHER PUBLICATIONS

W3C, RDF/XML Syntax Specification (Revised), Feb. 10, 2004, http://www.w3.org/TR/rdf-syntax-grammar/.*
W3C, RDF Primer, Feb. 10, 2004, http://www.w3.org/TR/rdf-primer.*
W3C, RDF Vocabulary Description Language 1.0: RDF Schema, Feb. 10, 2004, http://www.w3.org/TR/rdf-schema.*

* cited by examiner

*Primary Examiner* — Usmaan Saeed
*Assistant Examiner* — Brittany N Allen

(57) ABSTRACT

A directed graph of data includes nodes 10, properties 22 attached to nodes and resources 34. The nodes 10, properties 22 and resources 34 are classified as indexable or non indexable. At least one property 30 links a pair of nodes, one node being a parent and one being a child. An indexing algorithm indexes each indexable property pointing to a resource as related to any respective indexable nodes linked to the node to which the indexable property is attached through a chain of indexable links from child to parent through intermediate nodes, all of which are non-indexable.

18 Claims, 6 Drawing Sheets

INDEXING FOR DATA HAVING INDEXABLE AND NON-INDEXABLE PARENT NODES

FIELD OF THE INVENTION

The invention relates to indexing schemas, data repositories, methods for indexing data in data repositories, and code for carrying out such methods.

BACKGROUND OF THE INVENTION

There is a general desire to store content in a repository, and then to access the content through a network such as the internet.

The repository may be a conventional database that stores content in records having a number of fields. The conventional database may be a relational database. In such conventional databases, it is normal that some of the fields are indexed so that data in the indexed fields is stored in a separate index. The index may be searched for specific search terms data to identify records including those search terms.

Indexing is relatively well understood for data stored in conventional databases, for example, in a relational database. A data model stores data in a number of tables and the way in which the data in these tables is indexed is predefined.

However, such databases are generally only able to cope with precisely defined and relatively consistent data.

Alternative approaches are less restrictive.

One approach uses a W3C standard called the Resource Description Framework (RDF). In RDF, data is represented as a series of statements in the form (subject, predicate, object). Typically, RDF systems provide separate indexes for the subject, for the predicate and for the object. The use of multiple indexes improves speed when querying the database and gives additional flexibility. However, the amount of memory required to store the data is high.

Some XML databases such as Tamino, Oracle DB and Berkley DB also exist. These databases allow indexing to vary by properties, allowing the selection of properties to index.

Object Exchange Model (OEM) database systems are also known. These use data guides to create indexes. The data is represented as a forest of trees and the data guides compute all paths to a tree.

SUMMARY OF THE INVENTION

According to an aspect of the invention there is provided a method of indexing for a content repository, the method comprising:
  providing a content repository for storing a plurality of nodes in the form of a directed graph including at least one directed link, each directed link linking a parent node to a child node;
  providing items of information data, each item of information data being attached to a respective node;
  identifying each of the nodes as either an indexable node or a non-indexable node;
  identifying each of the items of information data and each of the directed links as indexable or non-indexable;
  indexing each item of indexable information data as relating to its respective node if the respective node is indexable, and otherwise indexing each item of indexable information data as relating to one or more indexable nodes, if any, that are linked to its respective node starting from the indexable node and linked to the respective node through a chain of one or more indexable directed links in the direction from parent node to child node without passing through any indexable nodes.

In another aspect, the invention relates to a method of indexing an indexable property of a directed graph, the directed graph having a plurality of nodes and a plurality of properties, each property being attached to a respective node, the properties pointing to data resources or nodes, each property and each node being identified as indexable or non-indexable, the method comprising:
  identifying a parent list of indexable nodes that are linked to the said indexable property either directly if the said indexable property is attached to an indexable node or indirectly through a chain of indexable properties without passing through any indexable nodes if the said indexable property is attached to a non-indexable node;
  identifying a child list of non-indexable nodes, if any, that are linked to the said indexable property either directly or through a chain of indexable properties passing only through non-indexable nodes; and
  creating for each node in the parent list an index entry for the said indexable property and each indexable property directly attached to each of the nodes in the child list, if any, each index entry linking the node in the parent list to the respective indexable property.

In other aspects, the invention relates to computer program, software products and systems for carrying out these methods.

In another aspect, the invention relates to a schema recorded on a data carrier for defining a data format in a repository having an index, the schema including:
  a plurality of property type definitions defining a plurality of property types;
  a plurality of node type definitions defining for each node type at least one property of defined type, the properties being pointers to a resource containing data or to other nodes;
  wherein at least one node type definition is defined to be indexable and at least one node type is defined to be non-indexable;
  wherein at least one property is defined to be indexable and at least one property is defined to be non-indexable; and
  wherein each of the properties defined in each node type is identified as indexable or non-indexable so that by defining individual node types and properties as indexable or non-indexable the indexing of data stored in the repository can be controlled.

In a further aspect, the invention relates to a data repository, comprising:
  a memory storing data in the form of a directed graph in the form of a plurality of nodes linked by directed links and a plurality of data items attached to respective nodes, the data items, directed links and nodes being identified as indexable or non-indexable, each directed link linking a parent node to a child node, each;
  a processor; and
  an index indexing each indexable data item as relating to the data item's respective node, if the respective node is indexable,
  wherein the index indexes each indexable data item, if the data item's respective node is not indexable, as relating to one or more indexable nodes, if any, that are linked to the respective node by a chain of one or more indexable directed links in the direction from parent node to child node starting from the indexable node and ending at the respective node without passing through any indexable nodes.

In a further aspect, the invention relates to indexing software on computer readable media material for indexing a directed graph in the form of a plurality of nodes and a plurality of properties, each property being attached to a respective node, the properties pointing to data resources or nodes, each property and each node being identified as indexable or non-indexable, the properties pointing to nodes creating a directed link between pairs of nodes defining a parent node and a child node, the indexing software being adapted, when run on a computer or server to carry out the steps of: creating an index entry relating each indexable property to the node to which the indexable property is attached, if that node is indexable, or otherwise to each indexable node, if any, that is linked to the respective indexable property through a chain of one or more directed links in the direction from parent node to child node, which do not pass through any intermediate indexable nodes.

BRIEF DESCRIPTION OF THE DRAWINGS

Embodiments of the invention will now be described, purely by way of example, with reference to the accompanying drawings in which.

DETAILED DESCRIPTION

Figure 1:
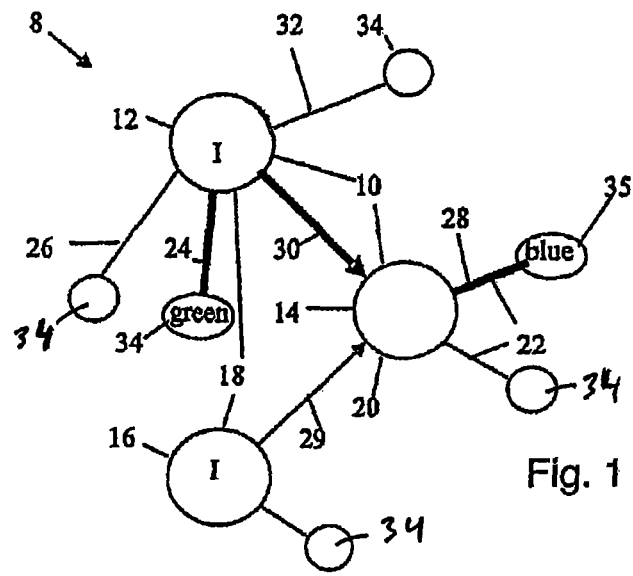
FIG. 1 shows a directed graph of information used in a first embodiment of the invention.

Referring to FIG. 1, in a first embodiment a data structure is a directed graph 8 including nodes 10 and properties 22. The nodes 10 are identified with respective universal resource indicators (URI) and have a set of properties 22 that point to one or more nodes or resources that store content, which will be referred to as the properties having "objects" that are nodes or resources. In this embodiment, the properties 22 are part of the state of the node and do not exist independently of the node. In alternative embodiments, the properties may be separately stored. In FIG. 1, the nodes 10 are represented by circles and the properties 22 by arcs extending from the respective nodes 10.

The properties 22 include properties 30 that have objects which are other nodes and properties 32 which have objects which are resources, such pointer properties 30 are therefore represented by arrows. The resources represent data items, i.e. they are items of information data. The properties 30 that point to objects thus represent a directed link of the directed graph. The resources represent information data attached to the respective node.

When a first node 12 has a pointer 30 that points to a second node 14, the second node 14 is known as a child node and the first node 12 as a parent node. Nodes may be both parents and children, or neither, and any node may have more than one parent or more than one child. In the example shown in FIG. 1, second node 14 has two parents, namely first node 12 and third node 16. Note that it is not necessary that all nodes are linked together.

Such directed graphs represent a convenient way of storing a wide variety of different types of data and thus represent a convenient general way of implementing a data repository that may need to include a wide variety of data that cannot all be predicted in advance.

Note that although the term "directed graph" is used the storage of the data need not be in any particular format. Conveniently, the directed graph may be stored by storing with each node a pointer to any child nodes. However, other storage options are also possible. Any suitable representation of the data may be used. For example, the nodes may be stored separately to the links of the graph, which may for example be stored as ordered pairs of data in the format (parent,child).

In order that data stored in this directed graph format may conveniently be indexed, some of the nodes are designated as indexable nodes 18, and others as non-indexable nodes 20. In FIG. 1, the indexable nodes are identified with an "I".

An index 40 (shown in FIG. 2) includes a number of index entries 46, each entry including an indexing term 42 and a corresponding pointer 44 to an indexable node. Index information is stored only for the indexable nodes. In other words, searching in the index for a search term amongst the indexing terms 42 will result in a result that is a pointer 44 to one of the indexable nodes.

Note that the index may index a number of different fields of the database, which may be thought of as separate sub-indexes. Thus, a search may search for a search term anywhere in the index or alternatively only in one or more defined fields.

This approach of only indexing some nodes, the indexable nodes 18, can have benefits in reducing the size of the index and ensuring that where a number of nodes of the directed graph are conceptually linked together, all the relevant index information points to the indexable nodes.

Further, some of the properties 22 are indexable properties 24 and others of the properties are non-indexable properties 26. The non-indexable properties are not included in the index, only the indexable properties, i.e. the resources and nodes pointed to by the indexable properties 24. Thus, the index 40 only includes index terms related to indexable properties and links them to index nodes 18. It is possible to select a suitable number of properties as indexable properties 24 to ensure the desired size of index. Note that the indexable properties need not necessarily be pointers 32 to resources 34 but can also be pointers 30 to nodes 10. The indexable properties are indicated using wider lines than the non-indexable properties.

The data of the directed graph 8 and index 40 are stored in memory 6 in a conventional computer 2 (FIG. 2) acting as a repository having input/output ports 4 for connecting to a network. Note that there may be a number of directed graphs 8 and a number of indexes 40; a single index may index multiple directed graphs. It will be understood that the data can instead be spread over a number of physical computers 2 which may be linked in a network.

The computer 2 also includes one or more processors 3 and software code 5 stored in memory, i.e. on a data carrier, for implementing the indexing algorithm described later.

The memory on which the graphs and software code are stored need not be the same. Further, the memory need not be internal to the computer and different memory formats may be used if required, including RAM, flash memory, disk drives including hard drives, CD drives, DVD ROM drives and many other formats all of which will be known to those skilled in the art.

The use of the term "repository" is not intended to limit the structure of the data to being in an unstructured format. The data can be structured in a conventional database, which may or may not be a relational database, or any of a number of less structured formats, for example using a resource description framework.

The directed graph may contain cycles and need not be fully connected.

In the first embodiment, the index includes an index entry 46 relating each indexable property to the node to which the indexable property is attached, if that node is indexable, or otherwise to each indexable node, if any, that is linked to the respective indexable property through a chain of one or more directed links in the direction from parent node to child node, which do not pass through any intermediate indexable nodes.

Thus, referring to FIG. 1, consider indexable property 24 attached to the first node 12. For the sake of example, assume that this points to resource 34 including the word "green". The indexable property 24 is directly attached to the indexable first node 12 and so the indexable property is indexed by an index entry 46 relating "green" to the first node. In the case that the resource 34 holds a word, as in this example, the index entry 46 may simply include that word, here "green" as the indexing term 42 and a pointer to the first node 12 as the pointer 44.

Note that in this embodiment the link 30 is an indexable property linked to the first node, so in this embodiment this link is indexed under the first node, thereby providing an index entry with an identifier of the second node indexed under the first node. Such an index entry can be used to search for the parent node of a node.

Consider now indexable property 28 attached to the second node 14. Assume that this points to a resource 35 including the word "blue". The second node 14 is not indexable, so the indexable property 28 is indexed as relating to each indexable node, if any, that is linked to the respective indexable property through a chain of one or more indexable directed links in the direction from parent node to child node, which do not pass through any intermediate indexable nodes.

In the present case, third node 16 is related to second node 14 though a chain of one or more directed links from parent to child, here a single directed link 29, but this directed link 29 is not indexable. Accordingly, the indexable property 28 attached to the second node 14 is not indexed under third node 16.

First node 12 is also related to second node 14 through a directed link 30, but in this case the link is an indexable property. Therefore, the indexable property 28 attached to the second node 14 is indexed as related to the first node. This is done by creating an index entry 46 that includes a suitable index term 42, here "blue", representing the contents of the resource 35 pointed to by the indexable property 28 attached to second node 14, and links it to a pointer 44 to the first node 12.

When the index 40 is created, the resource 34 is propagated back through the directed graph along indexable links 24,30 until an indexable node 12 is reached.

A search in the index 40 for "green" will therefore return a pointer to the first node 12. A search in the index 40 for "blue" will likewise return a pointer to the first node 12.

The information attached to the first and second nodes 12, 14 is essentially grouped together in the index by the indexable directed link 30 linking the first and second nodes 12,14 together with the identification of the first node 12 as indexable and the second node as non-indexable.

The reason why this is useful will become clearer with reference to the second embodiment below. For the moment, it suffices to note that data from the first and second nodes is indexed in a single place. Thus, by creating an indexable directed link, the database essentially groups the data as being represented by a single entity, the first, parent node.

The embodiment of the invention delivers a number of advantages.

In existing XML solutions for indexing, all properties of a certain type are indexed. In contrast, in the invention properties are indexed based not just on the property type but also the node type and the parent node type.

The embodiment allows for a great deal of flexibility, allowing the indexing behaviour to be customised. This can reduce index size.

The indexing concept can be applied to semi-structured, sparse data.

The indexing concept can cope with large or very large collections of data. When dealing with such collections, indexing is in practice required to search the data in an efficient manner. Indexing is relatively straightforward for relational databases in which the information has a very consistent structure.

However, for databases that are more free-form, it can be difficult identifying what needs indexing. When dealing with such semi-structured data, one approach is to index everything. This however leads to the considerable disadvantage of a very large index which consumes memory unnecessarily. A further disadvantage with such an approach is that instances of the data can include other instances of the data. An example will be presented below where the data represent emails and the emails can include other emails. Thus, to search within emails would also require a search within included emails and this would slow down retrieval. In the approach of the present embodiment, in general, the possibility to index included items under the parent node when the index is created, not when it is searched, can speed up retrieval.

The embodiment of the invention allows the number of indexed terms to be optimised, not necessarily to be the same over the whole database, thereby reducing the size of the database.

Unlike the prior art XML databases, the approach allows great flexibility to index different objects in different ways. Unlike existing RDF solutions, indexing behaviour can be customised.

A further way in which the approach of the embodiment allows a reduced index size is that the granularity of the index is controllable. That is to say, not all nodes are indexable nodes so data is only indexed to some, not all nodes. The invention thus allows indexing at a higher level than individual nodes, if required. Unlike prior OEM model databases, the indexing is not automatically created but may be tailored to particular requirements.

The indexing may be done in advance when data is added, rather than when a query occurs, so that the processing of a query is not delayed by carrying out indexing at the time.

The embodiment also includes an indexing algorithm for generating the index entries that will be described first by way of example with reference to FIG. 3.

The indexing algorithm operates as follows. When data is added to the repository, the algorithm checks if any indexable properties 24 are added. If so, if the indexable property is attached directly to an indexable node 18, then the indexable property 24 is simply indexed under the indexable node 18.

If on the other hand the indexable property is attached to a non-indexable node 20, the algorithm searches for any parent nodes that point to the non-indexable node 20 using an indexable property 24. The indexable property 24 is then indexed under each of the parent nodes that is an indexable node 18. If any of the parent nodes are again non-indexable, then the algorithm recursively searches for any nodes 10 that point to the non-indexable parent nodes using an indexable property 24, and continues up the directed graph 8 stopping on each branch when an indexable node 18 is reached. Thus, the indexable property 24 can be indexed under many parent, grandparent etc. nodes.

There is a further aspect to the algorithm. If the indexable property 24 is a pointer 30 to a child node that is a non-indexable node, then the algorithm indexes any indexable properties attached to the child node. If any of those indexable properties are again pointers to non-indexable nodes, which will then be grandchild nodes, the algorithm proceeds to index any indexable properties of the nodes pointed to by those grandchild nodes. This process proceeds recursively until an indexable node 18 is reached.

In this description, the term "free indexable property" will be used for an indexable property 24 attached to a non-indexable node 20. It is these properties that are indexed under indexable nodes 18 linked to the non-indexable node 20 by indexable properties.

Figures 3, 4:
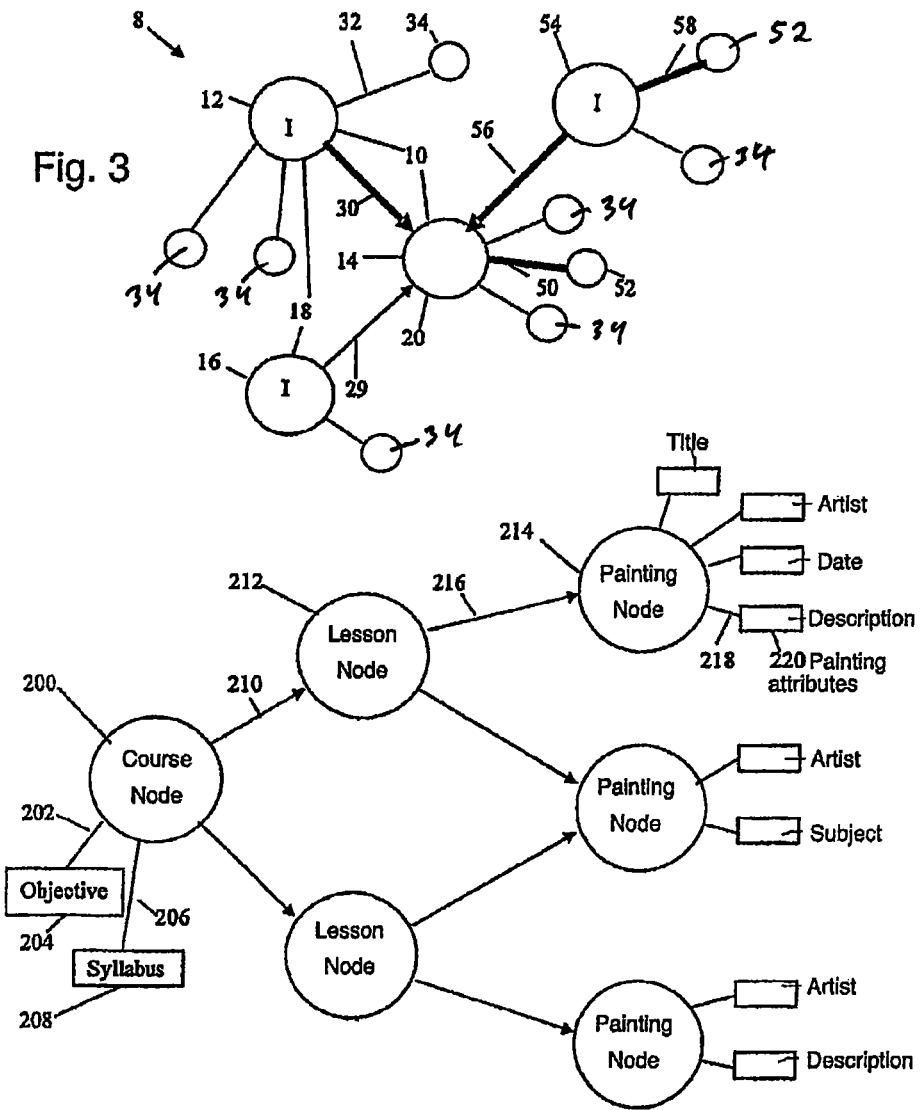
FIG. 3 illustrates the indexing of additional items of information in the first embodiment.
FIG. 4 shows directed graph of information used in a second embodiment of the invention.

A very simple first example is the addition of new indexable property 50 to the directed graph of FIG. 1; this is shown in FIG. 3. This indexable property 50 points to a resource 52. The indexable property 50 is attached to second node 14.

The algorithm firstly identifies that the indexable property 50 is attached to second node 14 which is not itself indexable. Therefore, the algorithm searches for nodes that point to node 14 via indexable properties. The first node 12 and third node 16 both point to node 14, but only the first node 12 points to node 14 with an indexable property 30. Since the first node 12 is an indexable node, the indexable property 50 is indexed under the first node 12. An index entry 42,44 is created linking an index term 42 characterising the resource 52 and an index entry 44 pointing to the first node 12.

If the third node 16 had pointed to the second node 14 with an indexable property, then the new indexable property 50 would have created two index entries, one pointing to the third node 16 and one to the first node 12.

FIG. 3 also shows the addition of a new indexable node 54 to the graph of FIG. 1. The new node has a single child node, the second node 14, and the property 56 linking the new indexable node 60 to the second node 14 is indexable. The new indexable node 54 also has a further indexable property 58.

The algorithm determines that the new node 54 is indexable and accordingly indexes the properties of the new node directly. The indexable property 58 creates a new index entry 42,44 linking an index term 42 corresponding to the indexable property to an index node entry 44 pointing to the new node 54.

The other indexable property of the new node 54 is the property 56 linking the new node 54 to child node 14. The algorithm therefore checks child node 54 for indexable properties, and finds indexable property 50. This indexable property 50 is then indexed under the new node address, i.e. a further entry is added to the index 40 indexing the indexable property 50 as an index term 42 linked to an index entry 44 pointing to the new indexable node 54.

A particular benefit of the algorithm according to this embodiment is that the algorithm aims to minimise the amount of re-indexing done when data is added. There is no need to re-index the whole database when data is added. By bounding the recursive searches when indexable nodes are reached, the number of nodes that need to be considered when new data is added is kept to a low level. Thus, the overhead used by the indexing is low.

A pseudocode implementation of the algorithm is:

```
SUB IndexProperty (node, property, object)
    IF property is indexable THEN
        // use a hash map to track the nodes that have been visited and avoid cycles
        visitednodes = new Hash
        // store the indexable nodes that are associated with this node in
        // roots
        roots = new List
        parents = new Stack
        parents.push (node)
        WHILE (parents not empty)
            next = parents.pop
            visitednodes.add(next)
            IF next is indexable THEN
                roots.add(next)
            ELSE
                FOR EACH parent with an indexableProperty pointing at next
                    // check for cycles
                    IF visitednodes does not contain parent THEN
                        parents.push(parent)
                    END IF
                END FOR
            END IF
        END WHILE
        // index all the properties in the current node under roots
        CreateIndex(roots, node, property, object)
        // if the object is a node, walk down the tree and index
        // the properties under root also
        IF object is a node THEN
            children = new Stack
            children.push (object)
            WHILE (children not empty)
                next = children.pop
                visitedNodes.add(next)
                IF next is not indexable THEN
                    FOR EACH indexableProperty of childNode
                        FOR EACH object of indexableProperty of childNode
                            CreateIndex(roots, node, indexableProperty, object)
                            // check for cycles
                            IF visitedNodes does not contain object THEN
                                children.push(object)
                            END IF
                        END FOR
                    END FOR
                END IF
            END WHILE
        END IF
    END IF
END SUB
SUB CreateIndex (roots, node, property, object)
    // if the object is a node, don't create the index under the root
    // create it under the subject, we need this information to
    // walk the tree efficiently
    IF object is a node THEN
        CreateIndexNode (node, property, object)
    ELSE
        FOR EACH root of roots
            CreateIndexNode (root, property, object)
        END FOR
```

```
        END IF
    END SUB
    SUB CreateIndexNode (node, property, object)
        FOR EACH alias of property
            index (node, alias, object)
        END FOR
    END SUB
```

To explain, the algorithm indexes a particular property attached to a particular node, the property pointing to a particular object which may be another node or a resource.

Firstly, the algorithm identifies the parent nodes associated with the property. If the node itself is an indexable node, then the list of parent nodes includes just the node itself (in spite of the name "parents"). If on the other hand the node is not indexable, the directed graph is searched upwards for nodes that point to the node in question with indexable properties. The end result is a list of nodes in the stack "parents" that lists all the nodes in which properties are to be indexed.

Then, the property is indexed using subroutine "CreateIndex", which only creates an index if the property is a data property pointing at a resource. The subroutine "CreateIndex" does this by calling "CreateIndexNode" which calls in turn "index" for each alias of the property.

In addition, if the "object" is a node, and an indexable property points to that node then a new stack of "children" is created and the properties of the children found and indexed.

The algorithm is able to efficiently index new data. In particular, in the case of an existing index, the algorithm is able to cope with the situation that the added property is a link connecting two large directed graphs together without excessive computation. The algorithm need only be called once, with the new property linking the directed graphs as the argument, and all of the required indexing updating is done. There is no need to call the algorithm multiple times for each of the properties of the graph.

The limitation to searching parents and children caused by stopping the respective tree searches when an index node is reached limits the extent to which the whole of the directed graph needs to be traversed to add data.

A number of specific examples of the working of the algorithm will be presented later with reference to the fourth embodiment. It will however be noted at this stage that the pseudocode is not the only code that could work to implement the indexing method according to the invention.

It will be appreciated that this is only one example of the invention. The power of the approach is the ability to index many different types of data using a single simple algorithm.

Figure 2:
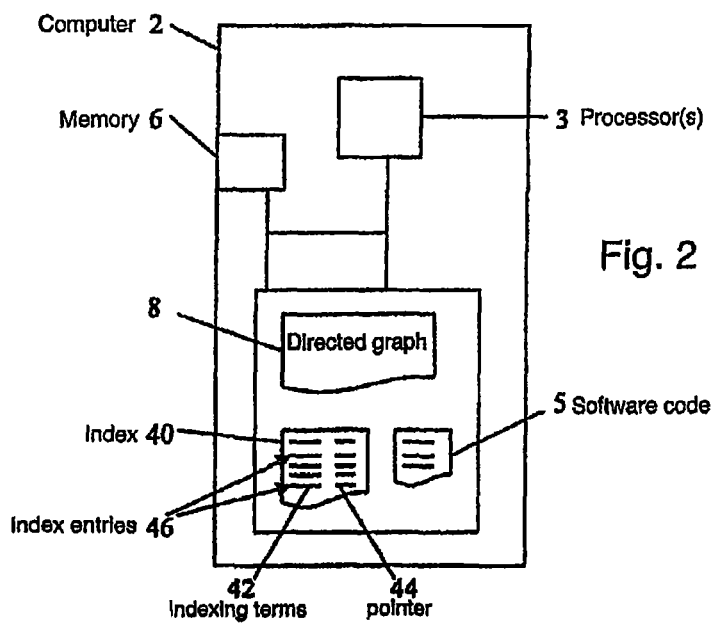
FIG. 2 shows a computer system used in the first embodiment of the invention.

A second embodiment of the invention will now be described with reference to a repository that stores data for a course of lectures such as might be given in a university or college. The data may be stored in a computer 2 (FIG. 2).

FIG. 4 illustrates the data structure of the repository. Conceptually, the data structure has the "course" as its fundamental building block.

The whole course is represented by a "course" node 200 having a number of properties. It has an "objective" property 202, which points to an "objective" resource 204 containing a description of the objective of the course, a "syllabus" property 206 pointing to a "syllabus" resource 208 containing a description of the syllabus, and a number of lessons, each represented by a "lesson" property 210 which points to a respective lesson. Each lesson is represented by a separate lesson node 212.

For the purposes of this example, we shall assume the course is a fine art course studying paintings. The information to be stored for each lesson therefore is a number of paintings, some information about each of the paintings, and a description of the lesson.

This information is stored in a directed graph format by creating a separate "painting" node 214 for each painting. A separate pointer resource 216 is provided in each lesson node 212 pointing to each of the painting nodes 214 of paintings referred to in that lesson node.

Each painting node 214 has a number of resources 220 describing attributes of the painting. Each of these resources is pointed to by a property 218 of the painting node.

In the example, the resources 220 include one resource relating to a description of the painting, one resource relating to the subject of the painting, one resource relating to the artist who painted the painting, one resource including the title of the painting and one resource including to the date of the painting. To avoid cluttering FIG. 4, these four resources are only shown for one of the painting nodes.

A further resource 222 is attached to each lesson node 212 by property 224 pointing to a description of the lesson. This may be, for example, lesson notes.

Let us now assume that the institution offering the course offers a number of courses, each including a number of lessons, each lesson including a number of paintings. Some of the courses may include the same lessons as each other, i.e. lessons may be shared between courses, and of course some of the paintings treated in the course may be featured in more than one lesson.

The institution now needs an indexing scheme to allow users, such as students, lecturers, or course administrators, to access the information contained in the data repository. Without such an index, users would be unable to access the information if they were not already aware of where the information relating to a particular painting was stored. However, if all information were indexed, the index could get too large.

Figure 5:
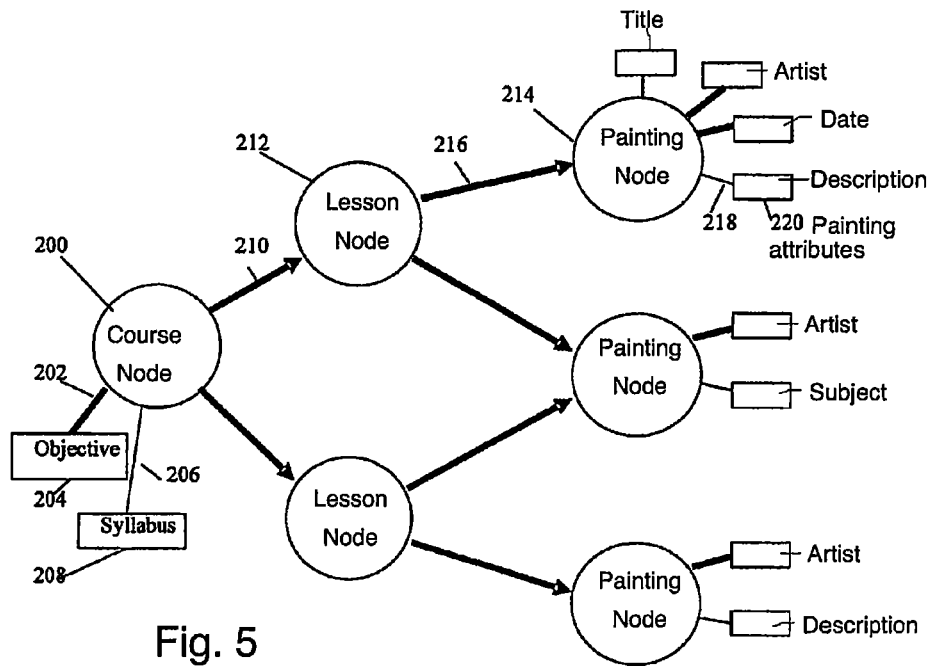
FIG. 5 illustrates the indexing of additional items of information in the second embodiment.

In the example, as shown in FIG. 5, the desired result is achieved by designating the objective property 202 as indexable in the "objective" field, as well as the lesson property 210. This is indicated in FIG. 5 using the thick black lines to indicate indexable properties. The painting property 220 is also indexable, as are two of the four properties of the painting node, namely the artist, and the date. The artist and date properties are indexed under their respective names, "artist" and "date".

The only indexable node will be the "course" node 200.

The index produced will be presented in a "triple" format, in the form (subject, category, object) where the subject is the node that is indexed, the category is the name of the field in which the property is indexed and the object is the term that is indexed.

In accordance with the indexing algorithm, only indexable properties need to be considered during indexing. Other properties can be completely ignored. This can be a benefit since it considerably simplifies and reduces the amount of information required by the indexing algorithm.

The "objective" property 202 is attached directly to course node 200 which is an indexable node. Accordingly, the objective property 202 is indexed directly as (coursenode, objective, "objective text"), where "objective text" is the text stored in the objective resource 204.

The "artist" property attached to painting node 214 is attached to a non-indexable node. Accordingly, the algorithm traverses the directed graph upwards using only indexable properties to find all indexable nodes which point to the painting node 214 along indexable properties without passing an intervening indexable node. In the present case, this results only in a single node, again the course node.

Thus, the "artist" property generates a single index entry (coursenode, artist, "artist name").

Similarly, the "date" property generates a single index entry (coursenode, date, "date").

This will be repeated for a number of paintings, and indeed courses. The approach generates an index that can be searched on three fields, objective, date, or artist, to give pointers to relevant courses. For example, the index could be searched for dates from between 1950 and 1960, which will return all courses dealing with paintings with these dates.

Instead of the algorithm defined above, the second embodiment uses an alternative indexing algorithm, which focuses on indexable nodes not properties. In the alternative algorithm, each indexable node is selected in turn. Then, all properties of the indexable node that point to resources are indexed. Next, all pointer properties of the indexable node that are pointers to any other node are selected in turn, and if the pointer property is indexable and the node pointed to by the pointer property is not, the node pointed to by the pointer property is indexed as a node, storing the index pointer as a pointer to the indexable node, not the node pointed to by the pointer property.

The alternative algorithm can be implemented recursively, by providing a routine IndexNode (node, indexas) that indexes a node as indexas. The IndexNode algorithm is called in turn for each indexable node using IndexNode (indexablenode, indexable node), i.e. with both arguments the same. The index node algorithm first indexes any indexable properties of the node indicated by the first argument (node), indexing them under the node indicated by the second argument (indexas). Then, for each non-indexable child node linked to the node by an indexable property, the IndexNode algorithm calls another instance of itself using IndexNode (childnode, indexas), i.e. using the same indexes argument but this time indexing the child node.

The alternative algorithm is particularly suitable for indexing the whole of a repository in one operation.

Note that this algorithm differs from that in the first embodiment in that it only indexes properties pointing to resources, not properties pointing to nodes. Thus, in this case, the algorithm does not index which lessons are attached to which courses.

Alternatively, it would be possible to implement the indexing in the second embodiment using the algorithm described above with reference to the first embodiment.

A third embodiment of the invention will now be described. This third embodiment is a concrete example of a repository 100 that stores emails.

The third embodiment includes a schema, i.e. a definition of the data types stored in the repository defining the indexing nodes. The schema in the embodiment is written in XML; however the skilled person will be aware of many other formats in which the schema could be written.

The third embodiment introduces the concepts of "node type" which is identified with a URI and which defines the set of properties that are considered part of the node type. It may also define constraints on whether these properties are mandatory and the allowable number of properties that are permitted for a node to conform to a type. The node type is represented by a schema.

The third embodiment also introduces the concept of a property type defining properties. These can be defined in the node type definition, for example in-line, or globally. The property type is also identified with a URI.

The following schema indexes properties http://somedomain/schema#to under the field named http://somedomain/schema#to.

```
<?xml version="1.0"?>
<RepoSchema
xmlns="http://csf.hpl.hp.com/definitions/1/0/repo/type-schema/"
xmlns:xsi="http://www.w3.org/2001/XMLSchema-instance"
xsi:schemaLocation="http://csf.hpl.hp.com/definitions/1/0/
repo/type-schema/
type-schema.xsd">
    <NodeType uri="http://somedomain/schema#Email">
        <IndexableNode/>
        <Property uri="http://somedomain/schema#to"/>
        <Property uri="http://somedomain/schema#body"/>
        <Index uri="http://somedomain/schema#to"/>
        <Index uri="http://somedomain/schema#body"/>
    </NodeType>
</RepoSchema>
```

Note that this schema defines an "Email" node type. A node that is an instance of the Email node type will be an indexable node, with properties "to" and "body". Both the properties "to" and "body" are indexed.

By default, the embodiment of the invention indexes properties under the URI used. Thus, in the example, there are two fields, "to" and "body", and these indexable properties are simply indexed in the respective "to" and "body" indexes.

However, it is possible to override this behavior and to index a property under several fields.

An example of a schema in which this is done is:

```
<?xml version="1.0"?>
<RepoSchema
xmlns="http://csf.hpl.hp.com/definitions/1/0/repo/type-schema/"
xmlns:xsi="http://www.w3.org/2001/XMLSchema-instance"
xsi:schemaLocation="http://csf.hpl.hp.com/definitions/1/0/
repo/type-schema/
type-schema.xsd">
    <NodeType uri="http://somedomain/schema#Email">
        <IndexableNode/>
        <Property uri="http://somedomain/schema#to"/>
        <Property uri="http://somedomain/schema#body"/>
        <Index uri="http://somedomain/schema#to"/>
        <Index uri="http://somedomain/schema#;to"
            indexAs="http://somedomain/schema#contentTo"/>
        <Index uri="http://somedomain/schema#body" indexAs="http://somedomain/schema#contentBody"/>
    </NodeType>
</RepoSchema>
```

The schema defines a node type called http://somedomain/schema#Email, with two properties, http://somedomain/schema#to and http://somedomain/schema#body. The node type is indexable, and the http://somedomain/schema#to property is indexed as http://somedomain/schema#to and as http://somedomain/schema#contentTo while property http://somedomain/schema#body is indexed as http://somedomain/schema#contentBody. Here the element <Index uri="http://somedomain/schema#to"/> is equivalent to <Index uri="http://somedomain/schema#to" indexAs="http://somedomain/schema#;to"/>.

A more complex example of a schema according to the third embodiment will now be presented. In XML format the schema may be presented as:

```
<?xml version="1.0"?>
<RepoSchema
xmlns="http://csf.hpl.hp.com/definitions/1/0/repo/type-
schema/" xmlns:xsi="http://www.w3.org/2001/XMLSchema-
instance"
xsi:schemaLocation="http://csf.hpl.hp.com/definitions/1/0/
repo/type-schema/
type-schema.xsd">
        <NodeType uri="http://somedomain/schema#Email">
            <Property uri="http://somedomain/schema#to"/>
            <Property uri="http://somedomain/schema#cc"/>
            <Property uri="http://somedomain/schema#bcc"/>
            <Property uri="http://somedomain/schema#subject"/>
            <Property uri="http://somedomain/schema#includes"/>
            <Index uri="http://somedomain/schema#includes"/>
        </NodeType>
        <NodeType
uri="http://somedomain/schema#applicationObject">
            <IndexableNode/>
        </NodeType>
        <NodeType uri="http://somedomain/schema#RootEmail">
            <Extends uri="http://somedomain/schema#Email"/>
            <Extends
uri="http://somedomain/schema#ApplicationObject"/>
            <Index uri="http://somedomain/schema#to"/>
            <Index uri="http://somedomain/schema#cc"/>
            <Index uri="http://somedomain/schema#bcc"/>
            <Index uri="http://somedomain/schema#subject"/>
            <Index uri="http://somedomain/schema#to" indexAs="
http://somedomain/schema#recipient"/>
            <Index uri="http://somedomain/schema#cc"
indexAs="http://somedomain/schema#recipient"/>
            <Index uri="http://somedomain/schema#bcc"
IndexAs="http://somedomain/schema#recipient"/>
        </NodeType>
        <NodeType uri="http://somedomain/schema#IncludedEmail">
            <Extends uri="http://somedomain/schema#Email"/>
            <Index uri="http://somedomain/schema#to" indexAs="
http://somedomain/schema#content"/>
            <Index uri="http://somedomain/schema#cc"
indexAs="http://somedomain/schema#content"/>
            <Index uri="http://somedomain/schema#bcc"
indexAs="http://somedomain/schema#content"/>
            <Index uri="http://somedomain/schema#subject"
indexAs="http://somedomain/schema#content"/>
        </NodeType>
        <PropType uri="http://somedomain/schema#includes"
range="http://somedomain/schema#IncludedEmail"/>
</RepoSchema>
```

This schema will be used in the following and so will now be described.

Firstly, a node type "Email" is defined which defines properties "to", "cc", "bcc", "subject" and "includes". The "includes" field is a pointer to another email. Only the "includes" property is defined as indexable. The node type "Email" is not defined to be indexable.

Then, a node type "ApplicationObject" is defined. This simply defines the "ApplicationObject" node to be indexable.

Then, a node type "RootEmail" is described. A node of type "RootEmail" takes the "Email" and "ApplicationObject" features and hence is indexable. Further, the definition makes the "to", "cc", "bcc", and "subject" fields all indexable under their own field names. The node type definition further defines a "recipient" field that indexes all of the "to", "cc" and "bcc" data Finally, a node type "IncludedEmail" is defined. Nodes of this type are not indexable. The "to", "cc", "bcc" and "subject" data of an included email are not indexed under the "to", "cc", "bcc" or "subject" fields, instead they are all indexed in a "content" field.

Figure 6:
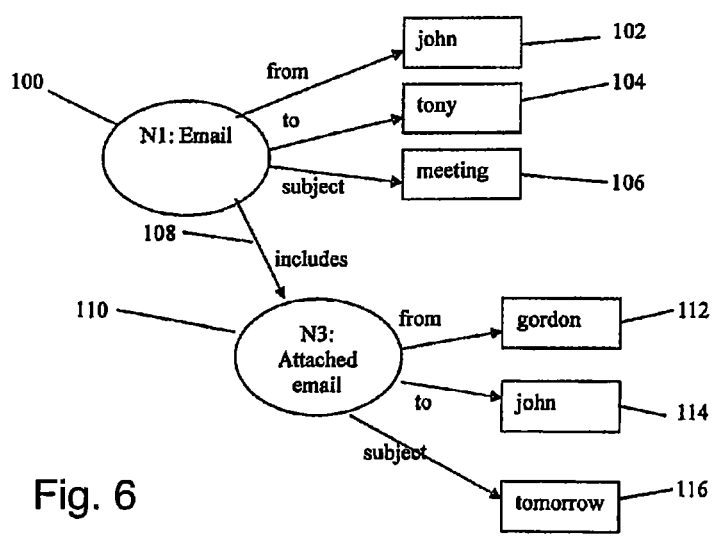
FIG. 6 illustrates a directed graph of information used in a third embodiment of the invention.

FIG. 6 shows a specific instance of a node of type RootEmail and an included node of type IncludeEmail according to this schema One email message 100 is sent from "john" to "tony" and has as the subject line of the email "meeting". This information is stored in a directed graph format with node 100 representing the email and "from" resource 102 storing the "from" information, "to" resource 104 storing the "to" information and "subject" resource 106 storing the "subject" information.

An attached email 110 is represented as a separate node linked by pointer property 108. The attached email node 110 is not indexable, since it is of type IncludedEmail, whereas the Email node 100 is of type RootEmail and is indexable.

The attached email has three properties pointing to "from" resource 112, "to" resource 114 and "subject" resource 116.

The indexing algorithm of the third embodiment is essentially the same as the first embodiment, for present purposes, and so the indexing of directed graph of FIG. 6 will now be briefly described.

As may be seen from the schema, all the properties in FIG. 6 are indexable. Since the root email 100 is an indexable node, all the properties are indexed as pointers to the RootEmail node 100. Since the attached email node 110 is not indexable, the indexable properties attached to the attached email 110 are propagated up the directed graph (i.e. in the reverse direction of the arrows shown) to email node 100 which is an indexable node so the properties are indexed there.

It will be seen that the directed graph of FIG. 6 generates index table entries as follows:

| Field | Index term | Pointer to |
|---|---|---|
| to | "tony" | RootEmail |
| from | "john" | RootEmail |
| subject | "meeting" | RootEmail |
| recipients | "tony" | RootEmail |
| contents | "gordon" | RootEmail |
|  | "john" | RootEmail |
|  | "tomorrow" | RootEmail |
| includes | N3 | RootEmail |

Note that there is no "bcc" or "cc" data so no index entry terms with these field names are provided. The indexing algorithm indexes each alias of the property "to" separately, so "tony" is indexed both in the "to" field and because of the alias "recipients" in the "recipients" field, and all of the properties of the included email are indexed in the "contents" field. All of the index entries point to the root email node 100.

Further, note that all of the indexed terms are strings except for N3, which is an index term that identifies the attached email by its node address, N3.

A point to note in FIG. 6 is that all of the properties are labeled. This is a feature of the third embodiment.

A representation of the same index uses triples in the following form:

(subject, property, object)

e.g.

(N1, http://somedomain/schema#from, "john")

where N1 is the subject, i.e. the identity of the node pointed to by the index entry, http://somedomain/schema#from is the property and "john" is the object.

Thus, the first line of the above index table may be represented as (RootEmail, to, "john").

in which the reference to the schema has been omitted for clarity.

A fourth embodiment is a development of the third embodiment using the slightly different schema:

```
<?xml version="1.0"?>
<RepoSchema
xmlns="http://csf.hpl.hp.com/definitions/1/0/repo/type-
schema/" xmlns:xsi="http://www.w3.org/2001/XMLSchema-
instance"
xsi:schemaLocation="http://csf.hpl.hp.com/definitions/1/0/
repo/type-schema/
type-schema.xsd">
    <NodeType uri="http://somedomain/schema#Email">
        <IndexableNode/>
        <Property uri="http://somedomain/schema#from"/>
        <Property uri="http://somedomain/schema#to"/>
        <Property uri="http://somedomain/schema#subject"/>
        <Property uri="http://somedomain/schema#hasAttachment"/>
        <Index uri="http://somedomain/schema#sender"/>
        <Index uri="http://somedomain/schema#to"/>
        <Index uri="http://somedomain/schema#subject"/>
        <Index uri="http://somedomain/schema#hasAttachment"/>
    </NodeType>
    <NodeType uri="http://somedomain/schema#AttachedEmail">
        <Property uri="http://somedomain/schema#from"/>
        <Property uri="http://somedomain/schema#to"/>
        <Property uri="http://somedomain/schema#subject"/>
        <Property uri="http://somedomain/schema#hasAttachment"/>
        <Index uri="http://somedomain/schema#sender" alias="
http://somedomain/schema#contents"/>
        <Index uri="http://somedomain/schema#to" alias="
http://somedomain/schema#contents"/>
        <Index uri="http://somedomain/schema#subject"
alias="http://somedomain/schema#contents"/>
        <Index uri="http://somedomain/schema#hasAttachment"/>
    </NodeType>
    <NodeType uri="http://somedomain/schema#WordDocument">
        <Property uri="http://somedomain/schema#contents"/>
    </NodeType>
</RepoSchema>
```

As will be noticed, this is very similar to the schema of the third embodiment except that the possible attachments now are not merely emails but also word documents. This is achieved by the addition of a new node type, "WordDocument".

Examples of the addition of items to the index using this schema and the algorithm according to the invention will now be presented.

Figure 7:
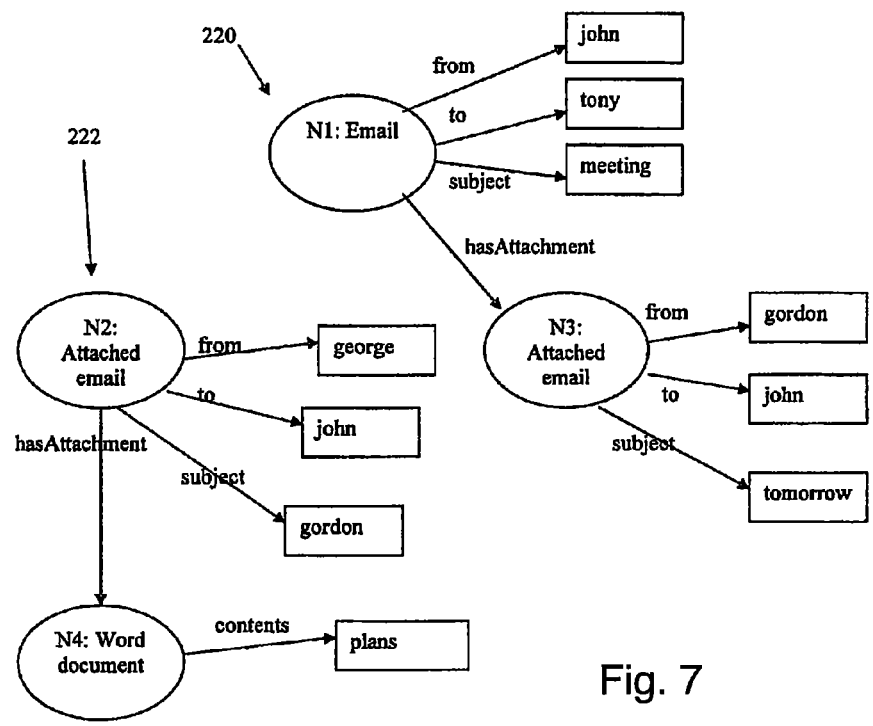
FIG. 7 shows directed graph of information used in a fourth embodiment of the invention.

The starting point will be the directed graph shown in FIG. 7. The only indexable node is node N1. The starting index is:

(N1, from, "john")
(N1, to, "tony")
(N1, subject, "meeting")
(N1, hasAttachment , N3)
(N1, contents, "gordon")
(N1, contents, "tomorrow")
(N1, contents, "john")

Note that the directed graph is divided into two separate sub-graphs 220,222, and that the lower 222 of the two sub-graphs has no indexable nodes. Accordingly, none of the information in the lower subgraph 222 is indexed at all.

Figure 8:
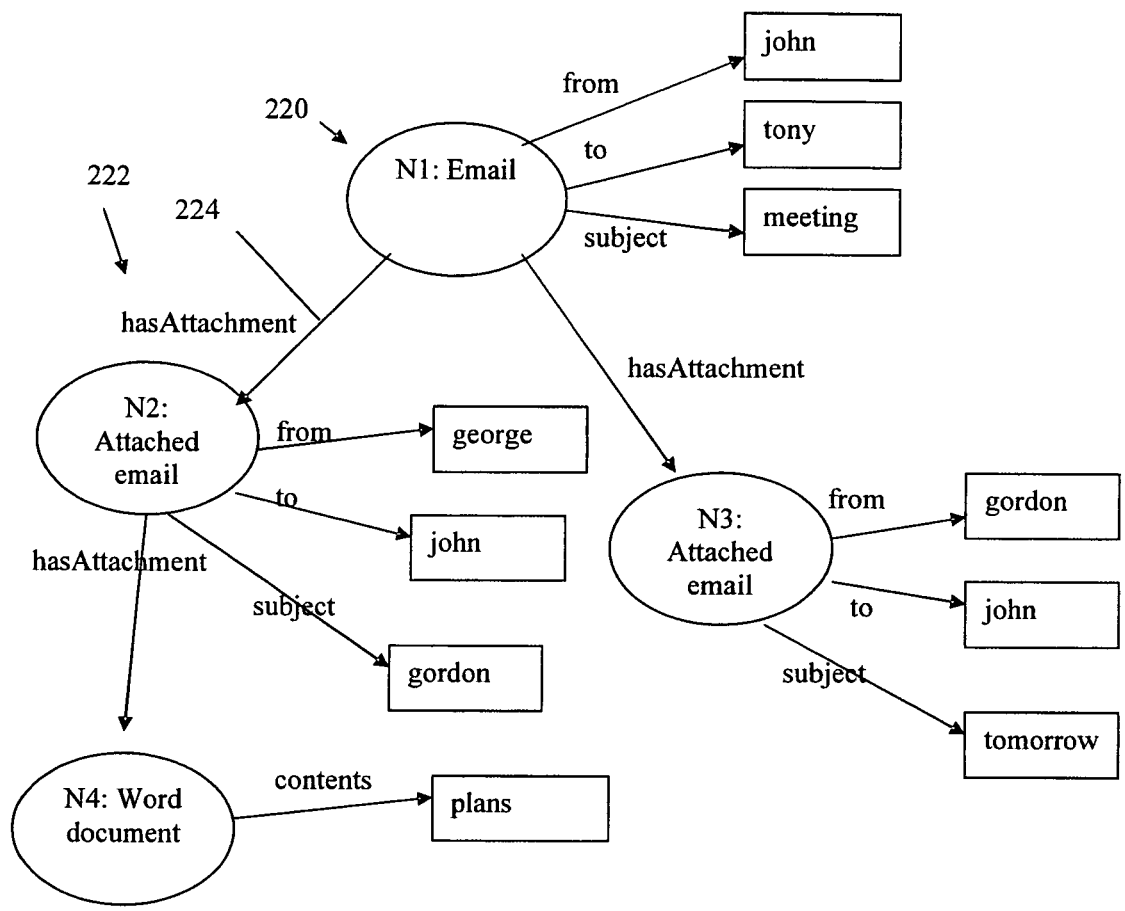
FIG. 8 illustrates the indexing of additional items of information in the fourth embodiment.

Now, let us add a single property 224 as shown in FIG. 8. The single added property 224 is an indexable property linking the Email node N1 to the Attached email node N2.

The algorithm as set out above now proceeds as follows. Firstly, the algorithm identifies that the property is indexable. If this were not the case, there would be nothing to be done.

Secondly, the algorithm notes that the new property 224 is attached to a single node, N1, which is an indexable node. Thus, it creates a stack of parents that has only a single member, node N1.

Next, the algorithm determines that the object pointed to by new property 224 is a node, node N2, and is not indexable. This means that properties of the node N2 need to be indexed as a result of the new property 224 being added to the graph. Further, the algorithm determines that node N4 is also a child node of N2 and therefore that properties of node N4 also need to be indexed. The algorithm therefore provides a "child" stack including two nodes, N2 and N4.

Next, all the indexable properties of the "child" nodes N2 and N4 are indexed under the parent node N2, together with an index entry related to the new property itself, here (N1, hasAttachment, N2).

For example, the "from" property with value "george" is indexed as (N1, from "george"). Each of the other indexable properties of the nodes N2 and N4 is also added to the index in a similar way, resulting in the index:

(N1, from, "john")
(N1, to, "tony")
(N1, subject, "meeting")
(N1, hasAttachment, N3)
(N1, contents, "gordon")
(N1, contents, "john")
(N1, contents, "tomorrow")
(N1, hasAttachment, N2)
(N1, contents, "george")
(N1, contents, "john")
(N1, contents, "gordon")
(N1, hasAttachment, N4)
(N1, contents, "plans")

It will be seen from this example that the indexing procedure is able to deal readily with the complex changes resulting from the joining of two separate sub-graphs.

Figure 9:
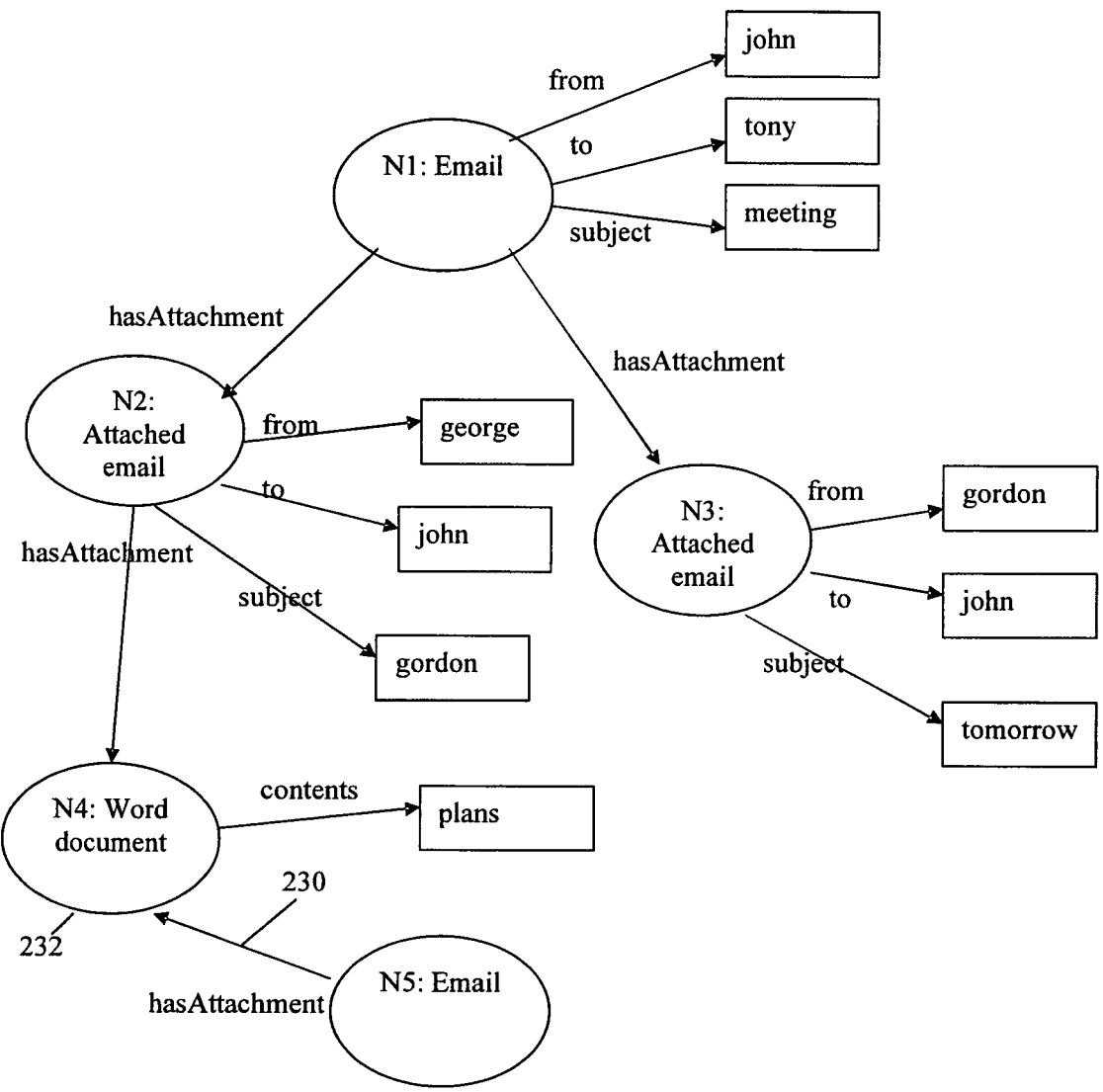
FIG. 9 illustrates the indexing of a further additional item of information in the fourth embodiment.

As shown in FIG. 9, consider now the case that a further node N5 is added. This is of type Email and so is indexable.

The single added indexable property is new property 230. This is attached to node N5 which is indexable. Accordingly, the provides a "parent" stack of nodes with a single member, N5.

The new property points to an object 232, node N4 that is a non-indexable node. Accordingly, properties of the node N4 are indexed under node N5 also. The only indexable property of N4 is "contents". The only indexable property of node N5 is "has attachment".

Thus, the following two index lines are added to the index;
(N5, hasAttachment, N4) and
(N5, contents, "plans").

Thus, again indexing information is readily added.

In variation of the fourth embodiment, the index list need only include entries relating to properties that point to resources, not nodes. Thus, in such an alternative embodiment, (N1, hasAttachment, N3), (N1, hasAttachment, N2) and (N1, hasAttachment, N4). This is the same as is done in the second embodiment, but the skilled person will readily see how this can be implemented also using a simple modification of the algorithm described with reference to the first embodiment using a parent stack and a child stack.

The embodiments described are all by way of example only and are not intended to be restrictive.

For example, the content repository can be distributed over a plurality of computer systems linked by a network. The indexing algorithm need not be a single piece of code, but separate items of code may be provided, for example on each of the computer systems.

Further, in alternative embodiments, in the event that a item of data attached to a non-indexable node may be indexed under multiple parent nodes, that item of data may be indexed under only one or some of those parent nodes.

We claim:

1. A computer-implemented method of indexing data representable as a directed graph including at least one directed link, each directed link linking a parent node to a child node, the data including items of information data attached to respective nodes, the method comprising:
   identifying each of the nodes as either an indexable node or a non-indexable node so as to yield at least one indexable parent node and at least one non-indexable parent node;
   identifying each of the items of information data and each of the directed links as indexable or non-indexable, wherein at least one non-indexable node has a non-indexable parent node and an indexable item of information attached to said at least one non-indexable node;
   indexing each item of indexable information data, for which the respective node is indexable, to its respective node;
   indexing each item of indexable information data, for which a parent node of the respective node is indexable and the respective node is non-indexable, to the parent node; and
   indexing each of at least one indexable item of information, for which the respective node and a parent of the respective node are both non-indexable, as relating to any one or more indexable parent nodes that are linked to its respective node starting from the indexable node and linked to the respective node through a chain of one or more indexable directed links in the direction from parent node to child node passing through the non-indexable parent node and without passing through any indexable nodes.

2. A method according to claim 1 further comprising the steps of:
   adding a new indexable directed link to a content repository containing said data, the new indexable directed link being attached to an added-to node and pointing to a non-indexable node;
   identifying indexable parent nodes either being the added-to node or nodes that are linked to the new indexable directed link through one or more indexable directed links from parent node to child node without passing through any indexable nodes;
   identifying child nodes being the non-indexable node to which the new indexable directed link points, and all nodes which are linked to the non-indexable node to which the new indexable directed link points through one or more indexable directed links in the direction from parent node to child node without passing through any indexable nodes; and
   indexing all indexable information data attached to each of the child nodes as relating to each of the respective parent nodes.

3. A method according to claim 1 wherein the step of indexing data as relating to a node stores an index entry having the node as its subject, and the indexable data as the index term.

4. A method according to claim 1 wherein each item of indexable information data attached to a respective node is indexed as relating to all indexable nodes that are linked to the respective node through a chain of one or more indexable directed links from parent node to child node starting from the indexable node and ending at the respective node without passing through any indexable nodes.

5. A computer-program product comprising non-transitory memory media encoded with software including code for:
   indexing a content repository storing a plurality of nodes in the form of a directed graph including at least one directed link, the nodes including parent nodes and child nodes, each directed link linking a parent node to a child node, the content repository including items of information data, each item of information data being attached to a respective node, each of the nodes, each of the items of information data and each of the directed links being identified as indexable or non-indexable, wherein at least one non-indexable node has a non-indexable parent node and an indexable item of information attached to said at least one non-indexable node, and
   indexing each item of indexable information data, for which the respective node is indexable, as relating to the respective node;
   indexing each item of indexable information data, for which a parent node of the respective node is indexable and the respective node is non-indexable, to the parent node; and
   indexing each of at least one indexable item of information, for which the respective node is non-indexable and a parent of the respective node are both non-indexable, as relating to any one or more indexable parent nodes that are linked to its respective node starting from the indexable node and linked to the respective node through a chain of one or more indexable directed links in the direction from parent node to child node passing through the non-indexable parent node and without passing through any indexable nodes.

6. A computer-program product according to claim 5 wherein said software further includes:
   code for adding a new indexable directed link to the content repository attached to an added-to node;
   code for identifying a list of indexable parent nodes either being the added-to node or nodes linked to the new indexable directed link through one or more indexable directed links in the direction from parent node to child node without passing through any indexable nodes;
   code for identifying child nodes being a non-indexable node to which the new indexable directed link points and all nodes which are linked to the non-indexable node to which the new indexable directed link points through one or more indexable directed links in the direction from parent node to child node without passing through any indexable nodes; and
   code for indexing all indexable information data attached to each of the child nodes as relating to each of the respective parent nodes.

7. A product according to claim 6 wherein said software further includes code for indexing the new indexable directed link as relating to each of the respective parent nodes.

8. A computer-implemented method comprising:
   obtaining a directed graph in the form of a plurality of nodes and a plurality of properties, each property being attached to a respective node, the properties pointing to data resources or nodes, each property and each node being identified as indexable or non-indexable, the properties pointing to nodes creating a directed link between pairs of nodes defining a parent node and a child node, wherein at least one non-indexable node has a non-indexable parent node and an indexable item of information attached to said at least one non-indexable node;
   creating an index entry relating each indexable property, for which the respective node to which the indexable property is attached is indexable, to that respective node;

creating an index entry relating each indexable property, for which the respective node is non-indexable and the parent of the respective node is indexable to the parent of the respective node; and creating an index entry relating each indexable property, for which the respective node and each parent node of the respective node are non-indexable, to an indexable node that is linked to the respective indexable property through a chain of one or more directed links in the direction from the indexable node, to the respective indexable parent node, wherein the chain does not pass through any intermediate indexable nodes.

9. A computer-implemented method comprising:

obtaining a directed graph, the directed graph having a plurality of nodes and a plurality of properties, each property being attached to a respective node, the properties pointing to data resources or nodes, each property and each node being identified as indexable or non-indexable so that there is at least one indexable parent node and at least one non-indexable parent node, wherein at least one non-indexable node has a non-indexable parent node and an indexable item of information attached to said at least one non-indexable node;

identifying a parent list of indexable nodes, including indexable nodes that are linked to the said indexable property directly if the said indexable property is attached to an indexable node, and including indexable parent nodes that are linked to the said indexable property indirectly through a chain of indexable properties without passing through any indexable nodes if the said indexable property is attached to a non-indexable node;

identifying a child list of non-indexable nodes that are linked to the said indexable property either directly or through a chain of indexable properties passing only through non-indexable nodes; and creating for each node in the parent list an index entry for the said indexable property and each indexable property directly attached to each of the nodes in the child list each index entry linking the node in the parent list to the respective indexable property.

10. A method according to claim 9, wherein the step of creating the index entry for a node in the parent list includes, for each index entry relating to an indexable property pointing to a resource:

creating an index term from the resource pointed to by the indexable property; and creating an index entry listing a URI of the node in the parent list and the index term.

11. A computer-implemented method comprising:

obtaining a directed graph, the directed graph being in the form of a plurality of nodes and a plurality of properties, each property being attached to a respective node, the properties pointing to data resources or nodes, each property and each node being identified as indexable or non-indexable, the properties pointing to nodes creating a directed link between pairs of nodes defining a parent node and a child node, wherein at least one non-indexable node has an indexable item of information attached to said at least one non-indexable node and has a non-indexable parent node;

receiving added data including at least one property or node; and for each indexable property in the received added data pointing to a data resource, carrying out the steps of:

identifying parent indexable nodes that are linked to the said indexable property either directly if the property is attached to an indexable node or if the said indexable property is attached to a non-indexable node indirectly through a chain of indexable properties in the direction from parent to child without passing through any indexable nodes; and creating for each parent indexable node an index entry for the said indexable property.

12. A method according to claim 11, further comprising:

for each indexable property in the received added data pointing to a node, carrying out the steps of:

identifying parent indexable nodes that are linked to the said indexable property either directly if the property is attached to an indexable node or if the said indexable property is attached to a non-indexable node indirectly through a chain of indexable properties in the direction from parent to child without passing through any indexable nodes;

identifying child non-indexable nodes that are linked to the said indexable property either directly or through a chain starting at the said indexable property and passing through a chain of indexable properties in the direction of parent to child without passing through any indexable nodes; and creating for each parent indexable node index entries for each indexable property directly attached to each of the child non-indexable nodes, each index entry linking the respective parent indexable node in the parent list to the respective indexable property directly attached to each of the child non-indexable nodes.

13. A method according to claim 12 further comprising for each indexable property in the received added data pointing to a node creating for each parent indexable node an index entry for the indexable property pointing to a node.

14. Non-transitory computer-readable memory media encoded with indexing software configured to, when run on a computer or server, implement the following steps:

accessing a directed graph in the form of a plurality of nodes and a plurality of properties, each property being attached to a respective node, the properties pointing to data resources or nodes, each property and each node being identified as indexable or non-indexable, the properties pointing to nodes creating a directed link between pairs of nodes defining a parent node and a child node so that there is at least one indexable parent node and at least one non-indexable parent node;

creating an index entry relating each indexable property, for which the respective node to which the indexable property is attached is indexable, to that respective node;

creating an index entry relating each indexable property, for which the respective node is non-indexable and the parent node of the respective node is indexable to the parent of the respective node; and creating an index entry relating each indexable property, for which the respective node and each parent node of the respective node are non-indexable, to an indexable node that is linked to the respective indexable property through a chain of one or more directed links in the direction from indexable node to the respective indexable parent node, wherein the chain does not pass through any intermediate indexable nodes.

15. Non-transitory computer-readable memory media encoded with indexing software configured to, when run on a computer or server, carry out the steps of:

accessing a directed graph, the directed graph having a plurality of nodes and a plurality of properties, each property being attached to a respective node, the properties pointing to data resources or nodes, each property and each node being identified as indexable or non-indexable, the properties pointing to nodes creating a directed link between pairs of nodes defining a parent node and a child node, wherein at least one non-indexable node has an indexable item of information attached to said at least one non-indexable node and has a non-indexable parent node;

for each indexable property in the received added data pointing to a data resource, carrying out the steps of:

identifying parent indexable nodes that are linked to the said indexable property,
- directly if the property is attached to an indexable node,
- indirectly through the node to which the property is attached if that node is non-indexable and has an indexable parent, or
- if the property is attached to a non-indexable node with a non-indexable parent node, indirectly through a chain of indexable properties in the direction from parent to child without passing through any indexable nodes; and creating for each parent indexable node an index entry for the said indexable property.

16. Memory media according to claim 15 wherein the software is further to create an index term from the resource pointed to by the indexable property; and to create an index entry listing a URI of the node in the parent list and the index term.

17. A computer-program product comprising non-transitory computer-readable memory media encoded with software configured to, when executed on a computer, cause the computer to implement a method including:

accessing a directed graph in the form of a plurality of nodes and a plurality of properties, each property being attached to a respective node, the properties pointing to data resources or nodes, each property and each node being identified as indexable or non-indexable, wherein at least one non-indexable node has an indexable item of information attached to said at least one non-indexable node;

receiving added data including at least one property or node; and for each indexable property in the received added data, carrying out the steps of:

identifying a parent list of indexable nodes that are linked to the said indexable property,
- directly if the property is attached to an indexable node,
- indirectly via the node to which the property is attached if that node is non-indexable and has an indexable parent node, or
- if the indexable property in the received added data is attached to a non-indexable node indirectly through a chain of indexable properties that passes through a non-indexable parent node of the node to which the property is attached without passing through any indexable nodes;

identifying a child list of non-indexable nodes that are linked to the said indexable property in the received added data either directly or through a chain of indexable properties passing only through non-indexable nodes; and creating for each node in the parent list an index entry for the said indexable property in the received added data and each indexable property directly attached to each of the nodes in the child list, each index entry linking the node in the parent list to the indexable property.

18. A computer-program product according to claim 17 wherein said software, when executed on a computer or server, carries out the further steps of, for each indexable property in the received added data pointing to a node:

identifying parent indexable nodes that are linked to the said indexable property either directly if the property is attached to an indexable node or if the said indexable property is attached to a non-indexable node indirectly through a chain of indexable properties in the direction from parent to child without passing through any indexable nodes;

identifying child non-indexable nodes, if any, that are linked to the said indexable property either directly or through a chain starting at the said indexable property and passing through a chain of indexable properties in the direction of parent to child without passing through any indexable nodes; and creating for each parent indexable node index entries for each indexable property directly attached to each of the child non-indexable nodes, each index entry linking the respective parent indexable node in the parent list to the respective indexable property directly attached to each of the child non-indexable node.

* * * * *